UNITED STATES PATENT OFFICE.

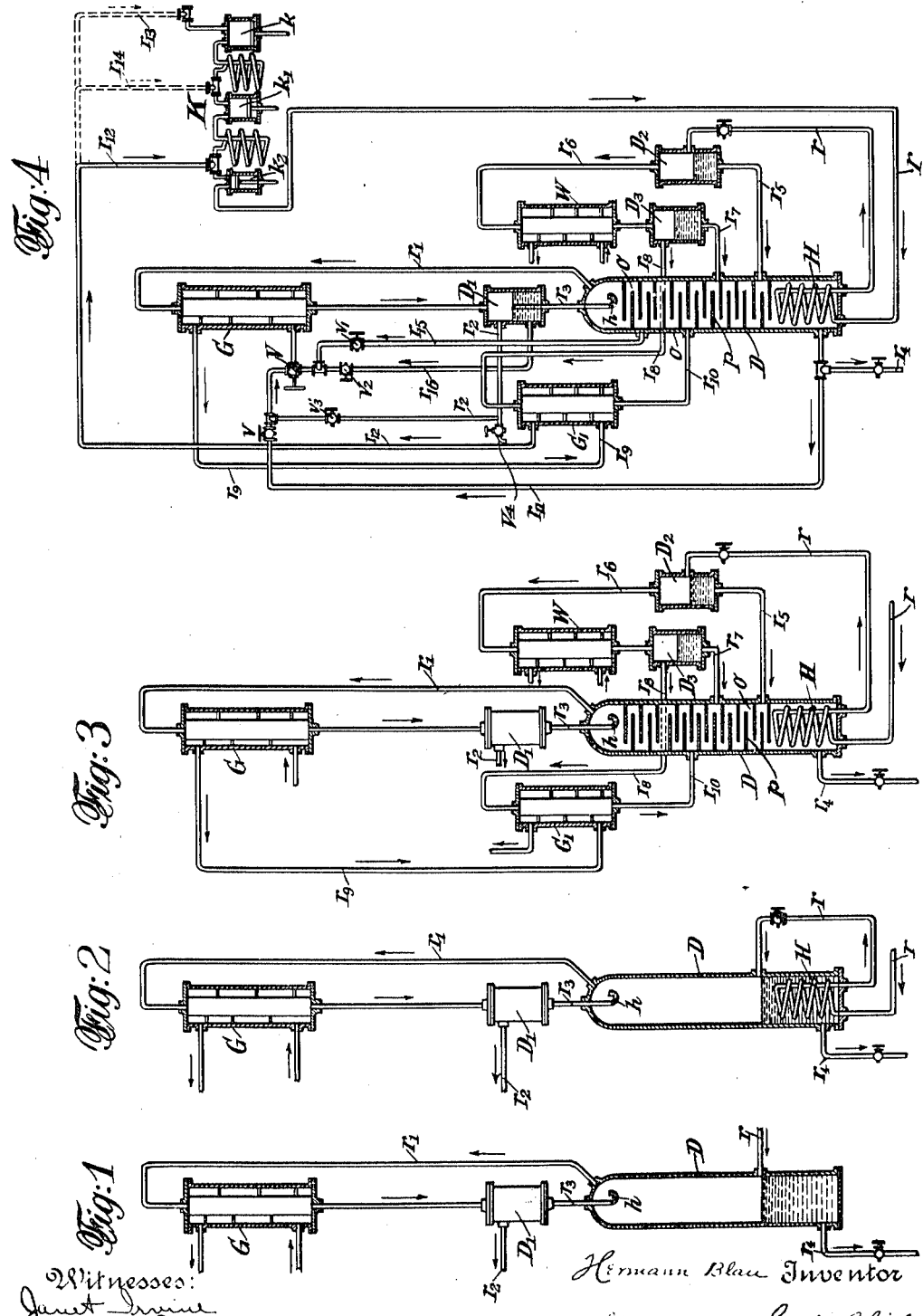

HERMANN BLAU, OF AUGSBURG, GERMANY.

ILLUMINATING LIQUEFIED GAS AND METHOD OF TREATING GASES.

1,073,843.  Specification of Letters Patent.  Patented Sept. 23, 1913.

Application filed July 31, 1911. Serial No. 641,691.

*To all whom it may concern:*

Be it known that I, HERMANN BLAU, a citizen of Germany, and a resident of Augsburg, Bavaria, Germany, have invented a new and useful Improvement in Illuminating Liquefied Gas and Methods of Treating Gases to Produce the Same, of which the following is a specification.

This invention relates to illuminating liquefied gas and method of treating gases to produce the same, and has for its object the recovery, in the manufacture of an illuminating liquefied gas, of liquefiable constituents from the so-called permanent gases, such as hydrogen and methane, the overcoming of difficulties heretofore encountered in the manufacture of an illuminating liquefied gas, increased economy and efficiency in the process and superiority in the product, together with other advantages hereinafter set forth.

In the accompanying drawing, forming part of this specification, is illustrated apparatus suitable for securing the objects of this invention.

Figure 1 is an elevation partly in vertical section of such apparatus. Fig. 2 is an elevation partly in vertical section of the apparatus shown in Fig. 1 with the addition of a heating coil H. Fig. 3 is an elevation partly in vertical section of the apparatus shown in Fig. 2 with the addition of the separating vessels $D_2$ and $D_3$ and the coolers W and $G_1$ and their connecting pipes and means for equipping the separating vessel D so that it is a rectification column. Fig. 4 is an elevation partly in vertical section of the apparatus shown in Fig. 3 with the addition of the compressor K and pipes and other means for employing the permanent gases, or a part of the liquefied gas, as a cooling agent.

In the several figures of the drawing, like letters denote like parts.

$r$ is a pipe for leading the compressed crude gases, from which easily volatile, liquid hydrocarbons have been separated, from the compressor K into the dephlegmating or separating vessel D (Figs. 1 and 2) or into the separating vessel $D_2$ (Figs. 3 and 4). The pipe $r$ may be formed into a heating coil H in the lower part of D (Figs. 2, 3 and 4). The dephlegmating or separating vessel D may be constructed as a rectification column by equipping it with partitions, such as horizontal plates $p$, which are provided with or leave alternating openings $o$ along the length of the vessel D (Figs. 3 and 4).

$r_1$ is a pipe leading from D through a cooler G and into the dephlegmating vessel $D_1$.

$r_2$ is a pipe leading away from the top of $D_1$ and $r_3$ is a pipe leading from $D_1$ into the top of D and terminating in or connected with a hydraulic valve $h$.

$r_4$ is a pipe leading from the lower part of D for use in filling the illuminating liquefied gas into vessels for shipment and use.

$D_2$ and $D_3$ are separating vessels. $r_5$ is a pipe leading from $D_2$ into a lower part of D.

$r_6$ is a pipe leading from the top of $D_2$ through a cooler W and into $D_3$. $r_7$ is a pipe leading from $D_3$ into a higher part of D. $r_8$ is a pipe leading from the top of $D_3$ through the cooler $G_1$ and $r_{10}$ is a pipe leading from the cooler $G_1$ into a still higher part of D.

$r_9$ is a pipe leading from the cooler G into the cooler $G_1$.

Pipe $r_{11}$ connects with and leads from pipe $r_4$ to the regulating valve V and cooler G. Pipe $r_{15}$ leads from an upper part of the dephlegmating or separating vessel D to the regulating valve V and cooler G. Pipe $r_{16}$ leads from the lower part of $D_1$ to the regulating valve V and cooler G. As shown in Fig. 4, pipe $r_2$ leads from the upper part of $D_1$ to the regulating valve V and cooler G.

V is a regulating valve to regulate the flow of liquefied gas from D or $D_1$ through pipe $r_{11}$ or through pipe $r_{15}$ or through pipe $r_{16}$, or the flow of permanent gases from $D_1$, through pipe $r_2$, to the cooler G.

$v$, $v_1$, $v_2$ and $v_3$ are cocks which may be employed to open and close pipes $r_{11}$, $r_{15}$, $r_{16}$ and $r_2$, respectively, and thus to permit liquefied gas to flow, through pipe $r_{11}$ or pipe $r_{15}$ or pipe $r_{16}$, or permanent gases to flow, through pipe $r_2$, to the regulating valve V and cooler G, when its cock is open, and to prevent such action when its cock is closed. Although the four pipes, $r_{11}$, $r_{15}$, $r_{16}$ and $r_2$, are shown in Fig. 4 connected with cooler G, as will be understood from the following description, only one of the four pipes so connected, preferably $r_{11}$, $r_{15}$ or $r_{16}$, is necessary to accomplish the cooling effect desired.

$r_4$ is an adjustable cock and outlet with which pipe $r_2$ may be provided when pipe $r_2$ leads, as shown in Fig. 4, from the upper part of $D_1$ to the regulating valve V and cooler G in order to secure in this way the use of permanent gases as a cooling agent, since, as will be well understood by those skilled in the art to which this invention appertains, there should be, as shown at $r_2$ in Figs. 1, 2 and 3, an exit from the upper part of $D_1$ for the permanent gases when the permanent gases are not employed as a cooling agent and for the excess of permanent gases when the permanent gases are employed as a cooling agent.

K is a compressor, which may consist of several cylinders to compress the crude gases and the evaporated or expanded gases, hereinafter referred to, at different stages of compression. In the drawing, three cylinders $k$, $k_1$ and $k_2$, are shown for the compression of said gases at three different stages of compression. The largest cylinder $k$ compresses the gases at the first or lowest stage of compression. The intermediate cylinder $k_1$ compresses the gases at the second stage of compression, which is higher, and the smallest cylinder $k_2$ compresses the gases at the third and still higher stage of compression. Pipe $r_{12}$ is a suction pipe, leading to the cylinder $k_2$ from the cooler $G_1$. Pipes $r_{13}$ and $r_{14}$, shown in dotted lines, are suction pipes leading to cylinders $k$ and $k_1$, respectively, from the cooler $G_1$ and are shown in dotted lines because, as hereinafter explained, the cooler $G_1$ should, preferably, be connected only with cylinder $k_2$.

The arrows of the drawing show the directions in which the gases and liquids flow.

The process for the production of liquefied illuminating gas out of gas mixtures containing hydrocarbons (distillation gases, such as oil gas, natural gas, etc.) makes use of the possibility of condensing those gaseous constituents whose critical temperature is above the normal temperature, and, besides that, it makes use especially of the fact that the easily volatile liquid hydrocarbons which are contained in the crude gas can dissolve other gases which quality increases with increasing pressure. Those permanent gases which are not dissolved in the liquid gas are separated out and gather above the compressed and liquefied gases; these permanent gases still contain a certain quantity of liquefiable gases. Nevertheless, this process is operated with comparatively small losses of liquefiable constituents and, besides that, these losses can be decreased by increasing the pressure used for compression, or by adding to the compressed crude gas a certain quantity of easily volatile hydrocarbons of gas-dissolving quality, or by leading the permanent gases which carry liquefiable gases, while under pressure, through an absorbing liquid, using, preferably, the counter-current principle, whereby liquefiable gases or constituents are absorbed or dissolved. The absorbing liquid dissolves mainly the liquefiable gases. Thereafter the gases dissolved in the absorbing liquid are released by allowing the liquid, which is saturated with gases, to pass out under the pressure of a suction-pipe of the compressor, the pressure of the suction-pipe being relatively lower, and then the released gases are sucked into the compressor again and compressed together with new crude gases. Experience in the practical use of the liquefied illuminating gas made according to the method just described has shown, however, that it is advisable not to take the easily volatile liquid hydrocarbons, which are contained in the crude gas, into the gas to be liquefied, or, at the utmost, to take only small quantities thereof, and to discard the main quantity thereof out of the crude gases before they are liquefied, which is done in the easiest and most efficient way by the process according to which the dephlegmation or separation is accomplished at one of the earlier of several stages of compression, using, if desired, water-cooling or other artificial cooling at the same time. The application of this method has shown, however, that new losses and difficulties are connected therewith, and that the efficiency of the whole apparatus is much decreased as soon as the above-mentioned dephlegmation is carried on energetically. Thorough investigations have shown that there are the following reasons for these facts: In discarding thoroughly easily volatile liquid hydrocarbons which form 25% to 30% of the weight of the heavy crude gas that has been made at low temperature, constituents with gas-dissolving qualities are taken out of the gas, which naturally results in the decreasing of the quantity of the condensed products (liquefied illuminating gas) which are obtained by compression and water-cooling; it decreases, however, not only because the weight of the discarded easily-volatile liquid hydrocarbons has to be deducted, but also for the reason that because they are no longer contained in the liquefied gas, those gaseous constituents which otherwise would have been dissolved therein escape together with the permanent gases. Thus the partial pressure of these liquefiable gases, contained in the permanent gases which are gathered above the liquid gases, increases correspondingly to the increase in quantity of those liquefiable gases and the whole quantity of the non-liquefied gases obtained as a by-product increases in the same proportion. Therefore, in this case, in order to recover by absorption the liquefiable constituents out of the permanent gases, firstly, a correspondingly larger quantity of absorbing liquid has to be used and, secondly, a larger quantity of gas becomes free upon the release of the pressure and has to be compressed again. Besides the fact that, therefore, with the above-described method of production heretofore used, a large volume of absorbed gases and of absorbing liquid constantly circulates through the apparatus, the forwarding of which requires a considerable quantity of power, another fact has to be considered, namely, that the gases released from the liquid, upon the release of the pressure, are carrying with them considerable quantities of vapors of the absorbing liquid; for the easily volatile hydrocarbons, for example, those which have been discarded from the crude gas itself by cooling or during compression, are used for, and are especially adapted for use as, an absorbing fluid. These vapors carried by the released gases can, it is true, without complicating the process, be discarded, during subsequent compression, at the same time as easily volatile hydrocarbons contained in the crude gas are discarded. As stated above, the more energetic dephlegmation of the crude gases results, however, in a greater quantity of absorbed gases circulating in the process, and at the same time the quantity of vapors of the absorbing liquid, which have to be discarded again during the compression, increases, and the addition of these to the crude gases has an effect directly contrary to the desired purpose of discarding easily volatile hydrocarbons. The more energetic application of the dephlegmation considerably decreases, therefore, the efficiency of the manufacturing process, firstly, on account of the fact that, in the process heretofore in use, larger quantities of absorbing liquid and the gases released therefrom have to circulate as ballast through the apparatus between considerably different pressures, and, secondly, because the vapors of the absorbing liquid which are carried by the released gases have considerably increased in quantity and have to be discarded also.

The present invention concerns a method and an apparatus for the production of liequefied illuminating gas, which do away with the difficulties mentioned above by using artificial cooling, instead of the absorbing process, for the recovery of the liquefiable constituents from the permanent gases. According to this process, the compressed crude gases, from which easily volatile liquid hydrocarbons have been separated, as by compression at a low stage of compression, are at first led through the pipe $r$ into a dephlegmating vessel D (Fig. 1) in which settle those constituents of the gas, which have already become liquid by compression and water cooling at normal temperature or at the temperature of the cooling water, whereas the permanent gases, which are above the liquid and are carrying, however, liquefiable gases in suspended form, are submitted as thoroughly as possible to strong artificial cooling, whereby the liquefiable constituents are separated out in liquid form. For this purpose the permanent gases are led, for instance, out of the vessel D through the pipe $r_1$ into the cooler G, which it is advisable to construct according to the counter-current principle, as shown in the drawing, and from there they are led into the dephlegmating vessel $D_1$, where the constituents that have become liquid by the artificial cooling separate from the constituents that have remained permanent gases. These permanent gases are then led away through the pipe $r_2$ whereas the condensate flows back through pipe $r_3$, which is connected with a hydraulic valve $h$, into the dephlegmating vessel D. According to the partial pressure of the liquefiable and permanent gases in the original mixture led into the dephlegmating vessel D through the pipe $r$ and according to the temperature of condensation that has been obtained by the cooler G and according to the pressure existing, the condensate contains, dissolved therein, a larger or smaller quantity of permanent gases, which, however, escape from the liquid in gaseous form when this liquid comes in contact with the liquid of a considerably higher temperature, for example, normal temperature, already contained in vessel D. This results in a gradual cooling down of the liquid gas which is contained in D as the condensation process goes on; and this increases its quality to dissolve permanent gases, and it has been found that when this cooled gas was filled directly from D through pipe $r_4$ into the shipping vessels (where it assumes normal temperature), it loses the homogeneity of its liquid state and passes partly again into gaseous form, preventing, thereby, the possibility of filling the bottles with the necessary weight. This can be avoided, however, by adding, before the filling, so much heat to the liquid gas that is gathered in the lower part of vessel D that the permanent gases dissolved therein are driven out and that the liquid gas itself is warmed to, or kept at, approximately normal temperature or a temperature a little above that. This additional heat can be taken from any source of heat; it can be acquired, for example, by leading the gas to be liquefied in its over-heated condition, as it is obtained, for instance, by compression without simultaneous water cooling, through a heating coil H (Fig. 2) which is placed in the lower part of D. As the compressed gas has the opportunity to give off in H the heat resulting from its compression, it liquefies, in part at least, and then is introduced into D itself for further treatment as described above.

It is advisable to increase the efficiency of the separating apparatus D by constructing it as a rectification column by equipping it with partitions, such as horizontal plates $p$, which are provided with or leave alternating openings $o$ along the length of the vessel D and which prevent the circulating of the liquid and the gases inside of the apparatus but allow the condensate to move in layers of corresponding specific gravity in the direction from the top to the bottom only, whereas the gases are allowed to rise from the bottom to the top. If, in this way, the lighter layers of the liquid and gas are gathered above the heavier layers, it furthermore seems to be advantageous to introduce the mixture of constituents which have already been liquefied and of constituents which are still gaseous, not directly from the heating coil H into the column D but to let it pass first through one or several separating vessels, $D_2$, $D_3$, in each of which the liquid is separated from the gaseous constituents. In order not to interfere with the rectification process that is going on in the column D, the liquid coming out of $D_2$, for instance, is introduced into column D through pipe $r_5$ at a point or place of the column where the gas mixture in the column itself has approximately the same temperature and the same composition as the liquid introduced from $D_2$. The gases gathered above the liquid in $D_2$ are led from there through pipe $r_6$ into a cooler W, where they are cooled off to the temperature of cooling water (about 10° C.) Consequently, another part of the gas is here separated out and gathers in $D_3$ below the gases which have not been liquefied and come out of W at the same time. Naturally, the composition of this liquid is different from that of the liquid in $D_2$, which has been obtained at a higher temperature out of the still heavier gases. The condensate obtained out of $D_3$ is the lighter one and contains a higher percentage of permanent gases in solution. Therefore it is introduced into the column through pipe $r_7$ at a place higher up than that obtained out of $D_2$. The gases that are not separated out as liquids in $D_3$ are led from there through a pipe $r_8$ through the counter-current cooler $G_1$ and may there be submitted to a further cooling process, by leading the cooling agent, which has already been used at a lower temperature in the apparatus G through pipe $r_9$ into $G_1$, where it is again used as a cooling agent. The gases which have been cooled in $G_1$ considerably lower than the temperature of the cooling water and which have been partly liquefied are led from there through pipe $r_{10}$ into the column D at a place which is higher up again than that which was chosen for the introduction of the condensate coming from $D_3$.

For the operation of the process just described the cooling agent, chosen for the cooling of the gases which are led through the counter-current apparatuses G and $G_1$ in order to cool them down to their temperature of condensation, is important. To secure the low temperatures employed, a gas that has been compressed and is again released can be used advantageously. In order to operate the whole process as practicably as possible, it is desirable, for this purpose of cooling, to use, after their release of pressure, the permanent gases which pass, under pressure, from the separating vessel $D_1$ through pipe $r_2$ and may pass therethrough to cooler G, as shown in Fig. 4. It was found, however, that the cooling effect of these gases, when they are released, is by far too small to obtain from them a sufficient cooling to the required temperatures and to obtain a sufficient condensation of the liquefiable constituents which are contained in the gases to be cooled. These gases will cool down the gas only to a temperature at which some only of the liquefiable constituents contained in the gas at this point are recovered and at which the permanent gases coming out of $D_1$ still contain a considerable percentage of liquefiable constituents, which, consequently, are not recovered as liquids. The operation of the process has given satisfactory results, however, if one part of the gas already liquefied is used as a cooling agent. This, for instance, may be taken out of the lower part of column D through pipe $r_4$ and be led through pipe $r_{11}$ (preferably after it has first been cooled) to the regulating valve V (Fig. 4) and to the counter-current apparatus G, where it escapes under the suction pressure of the compressor K. With the comparatively great cooling effect thus obtained, it is possible to reach very low temperatures, down to —100° C., if the liquid gas, before being treated in the column D, was substantially freed from easily volatile or carbureting liquid hydrocarbons. A still greater decrease of temperature can be obtained if the liquid gas, which consists mainly of ethylene, is taken, as by pipe $r_{15}$, from a higher place of the apparatus D, where it still contains, in solution, a considerable quantity of methane and a small percentage of hydrogen. However, if the column D has been constructed in a proper way, the employment of such very low temperatures is not necessary to the practical efficiency of the separation. If the liquid gas that has been obtained out of the process itself is used as a cooling agent, it gives the further advantage that it is not necessary to allow it to expand under the pressure of the suction pipe $r_{13}$ of the first stage of compression but that it may be allowed to expand under the pressure of the suction pipe $r_{14}$ or $r_{12}$ of the second or third stage of compression, whereby the desired cooling effect is obtained and the expenditure of less power is required to compress again the expanded gas than would be required if the liquid gas were permitted to expand at the pressure of the suction pipe of the first stage of compression. In this case, the gas that has vaporized or expanded and is still under pressure is sucked into the compressor again through, for instance, pipe $r_{12}$ and is again compressed. Whereas, with the method first described, where the cooling agent vaporized or expanded under the pressure of the suction pipe $r_{13}$ of the first stage of compression and was sucked into the compressor again by said pipe $r_{13}$, the efficiency of the compressor K was decreased, because, in such case, the first cylinder $k$ of the compressor K can receive and compress a smaller quantity of the crude gases on account of the presence of said expanded gases that have to be again compressed by it; but the efficiency is not decreased with the method last described and it requires less power to compress again the gas that has been used as a cooling agent.

As will be understood by those skilled in the art to which this invention appertains, variations may be made in details without departing from the main features of the invention.

Obviously the liquefied gas, made in accordance with this invention, can, in the usual manner, as by an admixture of air, be employed for the production of a non-luminous flame of great heating power adapted to heat to incandescence Welsbach mantles or other suitable objects and for numerous other purposes.

Among many other advantages that can be secured by the present invention are the advantages that a much greater volume of liquefied gas made according to this invention than of that heretofore made can be filled into containers for shipment or use and at a lower pressure; that the permanent gases and easily volatile hydrocarbons can be more thoroughly separated out with satisfactory results in the product; that liquefiable gases, which heretofore were carried away with permanent gases, can nearly all be recovered and made part of the liquefied gas; and that the liquefied gas can be made of a more uniform composition.

What I claim is:—

1. In the production of an illuminating liquefied gas, the method of recovering liquefiable constituents consisting in resolving compressed, crude gases into liquefied constituents and into gaseous constituents comprising permanent gases, separating such gaseous constituents from the liquefied constituents and liquefiable gases suspended in the permanent gases and then subjecting the gaseous constituents to strong artificial cooling, whereby liquefiable gases are separated out in liquid form, substantially as described.

2. In the production of an illuminating liquefied gas, the method consisting in separating easily volatile, liquid hydrocarbons from crude gases, resolving the remaining constituents of the crude gases into liquefied constituents and into gaseous constituents comprising permanent gases and liquefiable gases suspended in the permanent gases, separating such gaseous constituents from the liquefied constituents and then subjecting the gaseous constituents to strong artificial cooling, whereby liquefiable gases are separated out in liquid form, substantially as described.

3. In the production of an illuminating liquefied gas, the method of recovering liquefiable constituents consisting in cooling compressed, crude gases to a temperature, such as normal temperature, whereby the crude gases are resolved into liquefied constituents and into gaseous constituents comprising permanent gases and liquefiable gases suspended in the permanent gases, separating such gaseous constituents from the liquefied constituents and then subjecting the gaseous constituents to strong artificial cooling, whereby liquefiable gases are separated out in liquid form, substantially as described.

4. In the production of an illuminating liquefied gas, the method consisting in resolving compressed, crude gases into liquefied constituents and into gaseous constituents comprising permanent gases and liquefiable gases suspended in the permanent gases, separating such gaseous constituents from the liquefied constituents, then subjecting the gaseous constituents to strong artificial cooling, whereby liquefiable gases are separated out in liquid form and heating, to a temperature such as normal temperature, a portion of the cold gas mixture thus obtained in order to drive out permanent gases dissolved therein and thus to permit the liquefied illuminating gas to fill the vessels into which it is withdrawn for shipment or use, substantially as described.

5. In the production of an illuminating liquefied gas, the method consisting in resolving compressed, crude gases into liquefied constituents and into gaseous constituents, leading the liquefied and gaseous constituents into a rectification column, separating such gaseous constituents from the liquefied constituents and then subjecting the gaseous constituents to strong artificial cooling, whereby liquefiable constituents are separated out in liquid form, substantially as described.

6. In the production of an illuminating liquefied gas, the method consisting in resolving compressed, crude gases into liquefied constituents and into gaseous constituents, leading the liquefied and gaseous constituents into a rectification column at different points of elevation, separating such gaseous constituents from the liquefied constituents, subjecting the gaseous constituents to strong artificial cooling, whereby liquefiable constituents are separated out in liquid form, and then leading the gaseous constituents that have been thus liquefied back into the rectification column, substantially as described.

7. In the production of an illuminating liquefied gas, the method consisting in resolving compressed, crude gases, at successive stages, into liquefied constituents and into gaseous constituents, leading the liquefied and gaseous constituents into a rectification column at different points of elevation, separating such gaseous constituents from the liquefied constituents and then subjecting the gaseous constituents to strong artificial cooling, whereby liquefiable constituents are separated out in liquid form, substantially as described.

8. In the production of an illuminating liquefied gas, the method consisting in resolving compressed, crude gases, at successive stages, into liquefied constituents and into gaseous constituents, leading the liquefied and gaseous constituents into a rectification column at different points of elevation, separating such gaseous constituents from the liquefied constituents, then subjecting the gaseous constituents to strong artificial cooling, whereby liquefiable constituents are separated out in liquid form, and then leading the gaseous constituents thus liquefied back into the rectification column, substantially as described.

9. In the production of an illuminating liquefied gas, the method consisting in passing compressed, crude gases through a cooler, liquefied gas, resolving the compressed, crude gases thus cooled into liquefied constituents and into gaseous constituents comprising permanent gases and liquefiable gases suspended in the permanent gases, separating such gaseous constituents from the liquefied constituents and then subjecting the gaseous constituents to strong artificial cooling, whereby liquefiable gases are separated out in liquid form, substantially as described.

10. In the production of an illuminating liquefied gas, the method consisting in separating easily volatile, liquid hydrocarbons from crude gases, cooling the crude gases, resolving the crude gases into liquefied constituents and into gaseous constituents comprising permanent gases and liquefiable gases suspended in the permanent gases, separating such gaseous constituents from the liquefied constituents and then subjecting the gaseous constituents to strong artificial cooling, whereby liquefiable gases are separated out in liquid form, substantially as described.

11. In the production of an illuminating liquefied gas, the method consisting in cooling compressed, crude gases, resolving the compressed, crude gases into liquefied constituents and into gaseous constituents, leading the liquefied and gaseous constituents into a rectification column at different points of elevation, separating such gaseous constituents from the liquefied constituents and then subjecting the gaseous constituents to strong artificial cooling, whereby liquefiable constituents are separated out in liquid form, substantially as described.

12. In the production of an illuminating liquefied gas, the method consisting in separating easily volatile, liquid hydrocarbons from crude gases, cooling the crude gases, resolving the crude gases into liquefied constituents and into gaseous constituents, leading the liquefied and gaseous constituents into a rectification column at different points of elevation, separating such gaseous constituents from the liquefied constituents and then subjecting the gaseous constituents to strong artificial cooling, whereby liquefiable constituents are separated out in liquid form, substantially as described.

13. In the production of an illuminating liquefied gas, the method consisting in resolving compressed, crude gases into liquefied constituents and into gaseous constituents, leading the liquefied and gaseous constituents into a rectification column, rectifying the constituents led into the rectification column, separating such gaseous constituents from the liquefied constituents and then subjecting the gaseous constituents to strong artificial cooling, whereby liquefiable constituents are separated out in liquid form, substantially as described.

14. In the production of an illuminating liquefied gas, the method consisting in resolving compressed, crude gases into liquefied constituents and into gaseous constituents comprising permanent gases and liquefiable gases suspended in the permanent gases, separating such gaseous constituents from the liquefied constituents and then subjecting the gaseous constituents to the cooling effect, under release of pressure, of a constituent of the compressed, crude gases, whereby liquefiable constituents are separated out in liquid form, substantially as described.

15. In the production of an illuminating liquefied gas, the method consisting in resolving compressed, crude gases into liquefied constituents and into gaseous constituents comprising permanent gases and liquefiable gases suspended in the permanent gases, separating such gaseous constituents from the liquefied constituents and then subjecting the gaseous constituents to the cooling effect, under release of pressure, of liquefied constituents of the compressed, crude gases, whereby liquefiable constituents are separated out in liquid form, substantially as described.

16. In the production of an illuminating liquefied gas, the method consisting in resolving compressed, crude gases into liquefied constituents and into gaseous constituents comprising permanent gases and liquefiable gases suspended in the permanent gases, separating such gaseous constituents from the liquefied constituents, subjecting the gaseous constituents to the cooling effect, under release of pressure, of a constituent of the compressed, crude gases, whereby liquefiable constituents are separated out in liquid form, and then compressing the constituent thus employed as a cooling agent, substantially as described.

17. In the production of an illuminating liquefied gas, the method consisting in resolving compressed, crude gases into liquefied constituents and into gaseous constituents comprising permanent gases and liquefiable gases suspended in the permanent gases, separating such gaseous constituents from the liquefied constituents, subjecting the gaseous constituents to the cooling effect, under release of pressure, of a constituent of the compressed, crude gases, whereby liquefiable constituents are separated out in liquid form, and then compressing at one of the higher stages of compression employed for compressing the crude gases, the constituent thus employed as a cooling agent, substantially as described.

18. The method of producing an illuminating liquefied gas, consisting in compressing crude gases, resolving the compressed, crude gases, at successive stages into liquefied constituents and into gaseous constituents, leading the liquefied and gaseous constituents into a rectification column, rectifying the constituents led into the rectification column, separating such gaseous constituents from the liquefied constituents, subjecting the gaseous constituents to strong artificial cooling, whereby liquefiable constituents are separated out in liquid form, and leading the gaseous constituents thus liquefied back into the rectification column where they mix with constituents previously liquefied and form with such previously liquefied constituents the illuminating liquefied gas, substantially as described.

19. An illuminating liquefied gas comprising liquefied constituents of distillation gases and constituents of distillation gases absorbed by the liquefied constituents, containing in liquid form liquefiable gases recovered from permanent gases, such as methane and hydrogen, by cooling after the permanent gases have been separated from the liquefied constituents, substantially as described.

20. An illuminating liquefied gas comprising liquefied constituents of distillation gases and constituents of distillation gases absorbed by the liquefied constituents, substantially free from constituents such as easily volatile liquid hydrocarbons and containing in liquid form liquefiable gases recovered from permanent gases, such as methane and hydrogen, by cooling after the permanent gases have been separated from the liquefied constituents, substantially as described.

21. An illuminating liquefied gas comprising liquefied constituents of distillation gases and constituents of distillation gases absorbed by the liquefied constituents, substantially free from permanent gases, such as methane and hydrogen, and containing in liquid form liquefiable gases recovered from permanent gases, such as methane and hydrogen, by cooling after the permanent gases have been separated from the liquefied constituents, substantially as described.

22. An illuminating liquefied gas comprising liquefied constituents of distillation gases and constituents of distillation gases absorbed by the liquefied constituents, substantially free from constituents such as easily volatile liquid hydrocarbons, and from permanent gases, such as methane and hydrogen, and containing in liquid form liquefiable constituents of the distillation gases, that are dissolvable in constituents such as easily volatile liquid hydrocarbons, recovered from permanent gases, by cooling after the permanent gases have been separated from the liquefied constituents, substantially as described.

23. An illuminating liquefied gas comprising liquefied constituents of distillation gases and constituents of distillation gases absorbed by the liquefied constituents, substantially freed, as by heating from permanent gases, such as methane and hydrogen, substantially as described.

24. An illuminating liquefied gas comprising liquefied constituents of distillation gases and constituents of distillation gases absorbed by the liquefied constituents, substantially freed, as by heating, from permanent gases, such as methane and hydrogen, and capable of being employed in liquid form at normal temperatures substantially to fill closed containers, substantially as described.

HERMANN BLAU.

Witnesses:
  LINA DISCHL,
  RICHARD LEMP.